A method and apparatus for the installation of a live operating

(12) United States Patent
Macken et al.

(10) Patent No.: US 9,424,017 B2
(45) Date of Patent: Aug. 23, 2016

(54) LIVE OPERATING SYSTEM INSTALLATION FOR UNIVERSAL SERIAL BUS DEVICES

(75) Inventors: Luke J. Macken, Westford, MA (US); Jeremy L. Katz, Arlington, MA (US)

(73) Assignee: Red Hat, Inc., Raleigh, NC (US)

( * ) Notice: Subject to any disclaimer, the term of this patent is extended or adjusted under 35 U.S.C. 154(b) by 1169 days.

(21) Appl. No.: 12/201,311

(22) Filed: Aug. 29, 2008

(65) Prior Publication Data

US 2010/0058325 A1    Mar. 4, 2010

(51) Int. Cl.
*G06F 9/445*       (2006.01)

(52) U.S. Cl.
CPC ........................................ *G06F 8/61* (2013.01)

(58) Field of Classification Search
CPC ......... G06F 8/61; G06F 9/54; G06F 17/3028; G06F 13/00
USPC ........................... 717/122, 174; 380/255–276; 709/220–222
See application file for complete search history.

(56) References Cited

U.S. PATENT DOCUMENTS

| | | | | |
|---|---|---|---|---|
| 6,006,035 | A * | 12/1999 | Nabahi | 717/175 |
| 6,158,002 | A * | 12/2000 | Kwan et al. | 713/2 |
| 6,178,469 | B1 * | 1/2001 | Hennessy et al. | 710/9 |
| 6,282,641 | B1 * | 8/2001 | Christensen | 713/2 |
| 6,360,364 | B1 * | 3/2002 | Chen et al. | 711/169 |
| 6,963,981 | B1 * | 11/2005 | Bailey et al. | 726/22 |
| 7,577,722 | B1 * | 8/2009 | Khandekar et al. | 709/220 |
| 7,949,641 | B1 * | 5/2011 | Eatough | 707/705 |
| 2003/0191623 | A1 * | 10/2003 | Salmonsen | 703/24 |
| 2004/0194081 | A1 * | 9/2004 | Qumei et al. | 717/173 |
| 2005/0038960 | A1 * | 2/2005 | Himmel | G06F 21/121 711/115 |
| 2005/0144617 | A1 * | 6/2005 | Chefalas et al. | 717/174 |
| 2005/0193188 | A1 * | 9/2005 | Huang | 713/1 |
| 2006/0168389 | A1 * | 7/2006 | Bentley | G06F 9/4406 711/2 |

OTHER PUBLICATIONS

Megumi Nakamura & Seiji Munetoh, "Designing a Trust Chain for a Thin Client on a Live Linux CD", Mar. 2007, ACM, Proccedings of the 2007 ACM symposium on Applied Computing, pp. 1605-1606.*
Nakamura et al, "Designing a Trust Chain for a Thin Client on a Live Linux CD", Mar. 2007, Proceeding of the 2007 ACM symposium on Applied Computing, pp. 1605-1606.*
Microsoft, The Microsoft Computer Encyclopedia, 2002, Microsoft Press, vol. 5, p. 113.*

* cited by examiner

*Primary Examiner* — Chat Do
*Assistant Examiner* — Sergio J Curbelo, III
(74) *Attorney, Agent, or Firm* — Lowenstein Sandler LLP

(57) ABSTRACT

A method and apparatus for the installation of a live operating system includes an installation module that automatically detects available portable removable storage devices. The installation module also automatically determines available operating systems for installation on the portable removable storage devices. The determination of available operating systems can include checking for available operating systems on remote servers. The installation module provides a user interface that is populated with the available installation options including the options to select a size of a persistent overlay and the use of encryption. The installation process installs the user selected operating system on the user designated portable removable storage device and validates the installation. The installation can be performed without generating a new partition on the portable removable storage device and without reformatting the device.

17 Claims, 4 Drawing Sheets

LIVE OPERATING SYSTEM INSTALLATION FOR UNIVERSAL SERIAL BUS DEVICES

TECHNICAL FIELD

Embodiments of the present invention related to a method and system for installing an operating system onto a portable removable storage device. Specifically, the embodiments of the present invention relate to a method and system for installing a live operating system on a portable removable storage device along with a persistent overlay without having to reformat the portable removable storage device.

BACKGROUND

Portable removable storage devices, such as devices that combine Universal Serial Bus (USB) connections with Flash memory devices, have become widely used to store data. These devices can be connected to any computer system with a USB port and are small enough to be carried in the user's pocket or on their keychain. In addition, the amount of storage space in these devices has increased dramatically, such that devices with 2 gigabytes of storage are available in the keychain form factor.

When connected with a computer, these devices are made available to the user in the same manner that fixed disks are made available. The user can navigate the file systems on the removable storage device using the same interface as is available for fixed disks.

These devices are primarily utilized for document storage, including the storage of text documents, image files, presentations, spreadsheets and similar data. Applications are not typically installed on these devices, because most operating systems track application data in a registry, which can result in inaccurate registry entries when the removable device is disconnected.

Similarly, operating systems are not installed on these devices because they are configured to execute with a particular computer by installation and execution of drivers that are specific to that computer. The removable portable storage devices are moved frequently between computers with different computers with different hardware configurations. Thus, an operating system installed on these devices is not easily configured.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for the installation of a live operating system. The apparatus includes a live operating system installation module. The installation module automatically detects available portable removable storage devices. The installation module also automatically determines available operating systems for installation on the portable removable storage devices. The determination of available operating systems can include checking for available operating systems on remote servers. The installation module provides a user interface that is populated with the available installation options including the options to select a size of a persistent overlay and the use of encryption. The installation process installs the user selected operating system on the user designated portable removable storage device and validates the installation. The installation can be performed without generating a new partition on the portable removable storage device and without reformatting the device.

Figure 1:
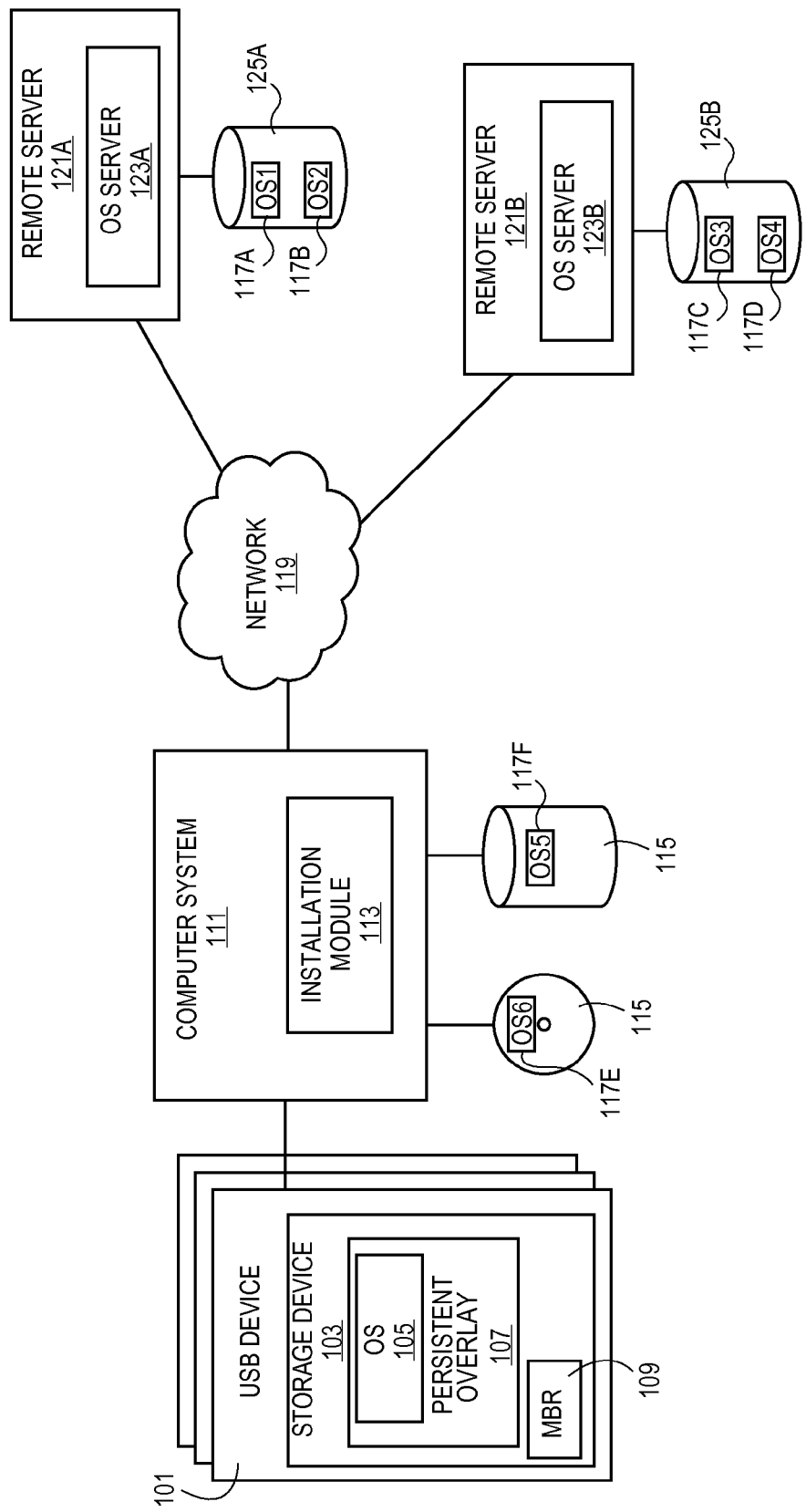
FIG. 1 is a diagram of one embodiment of a system for live operating system installation.

FIG. 1 is a diagram of one embodiment of a system for live operating system installation. The system includes a portable removable storage device 101, computer system 111, network 119 and a set of remote servers 121A,B. A 'set,' as used herein, refers to any whole number of items including one item. In other embodiments, the set of remote servers 121A,B and/or network 119 are absent.

The portable removable storage device 101 can be any type of persistent storage device that has a small form factor for easy transport such as a memory stick, key chain, lip stick, palm-sized, handheld or similar form factor. Example devices include universal serial bus (USB) key chain Flash drives and other types of small Flash drives, portable hard drives with USB connectors, handheld music player devices (e.g., the iPod by Apple, Inc. of Cupertino, Calif.), handheld gaming sets (e.g., the PSP by Sony Corporation of Tokyo, Japan) and similar devices. These small form factors have limited storage capacity due to their size. For example, most key chain storage devices have a capacity of eight gigabytes or less.

The limited storage capacity of these storage devices prevents standard operating system installations from being placed on them. Standard operating system installation programs do not check the availability of such drives for this reason as well as the uncertainty of configuring an operating system for such a device. These devices are removeably coupled with the computer system through an external port such as a universal serial bus (USB) port. The nature of these connections is temporary. In contrast, internally mounted fixed disk drives and similar devices are not considered to be removably coupled to the computer system, because these devices are internally mounted and significant effort must be made to unmount them both physically and in software. Thus, the term 'removable storage device,' as used herein, excludes these fixed disk drives.

The removable portable storage devices can have any connection mechanism and utilize any storage mechanism 103. The removable portable storage device 101 can use a USB connector, infrared connector, serial port connector, parallel port connector, Firewire connector, Bluetooth connector or similar connection technology. The storage mechanism 103 can be a Flash drive, re-writable optical drive, magnetic drive or similar data storage system. The storage mechanism 103 can have any size including 1 megabyte to over 10 gigabytes.

The storage mechanism 103 can have any file system format and any number of partitions at any given time. The files system can be used to store any number of files and applications. The storage mechanism 103 can also include a master boot record 109. The storage mechanism can store any number of live operating systems 105. A live operating system 105, as referred to herein, is an operating system stored in a format that is ready for execution upon call from a master boot record 109. Each operating system can be associated with a persistent memory overlay 107. A persistent memory overlay or persistent overlay 107, as referred to herein, is an area of memory in the portable storage device 101 that is reserved for the use of the associated operating system 105. This area of the memory can be formatted and utilized in a manner analogous to the use of fixed disk storage space by an operating system in a conventional computer system. The persistent memory overlay 107 can have any size. The size of the persistent memory overlay 107 can be selected by a user of the live operating system through the installation module 113.

The computer system 111 can be any type of computer system including a workstation, desktop computer, laptop computer, handheld computer, console device or similar computer system. The computer system 111 can include a removable media reader such as a tape drive, digital versatile disc (DVD) drive, compact disc read/write (CD-RW) drive or similar removable media drive. The removable media reader can access the contents of removable media such as CDs, DVDs, tapes and similar media. These removable media can have an operating system 117E stored therein that is in an archived format that is intended to be installed onto other devices. The computer system 111 can also include a set of fixed disk devices 115 such as a magnetic storage device or similar storage device. The fixed disk devices 115 typically store a live operating system 117F. In some circumstances the live operating system can be reinstalled onto other devices.

The computer system 111 includes an installation module 113. The installation module 113 is software component or a hardware component of the computer system 111. The installation module 113 is initiated by a user and provides a user interface that allows a user to select an operating system from the available operating systems to be installed onto the portable storage device 101.

The computer system 111 can communicate with a set of remote servers 121A,B over a network 119. The network 119 can be any type of network including a local area network (LAN), a wide area network (WAN), such as the Internet, or similar network. The network 119 can be a wired network, wireless network or any combination thereof. The computer system 111 can be connected to any number of separate networks 119.

The remote servers 121A,B can be any type of computers including desktops, dedicates servers, workstations, mainframes and similar computer systems. The remote servers 121A, B execute respective operating system servers 123A,B, include or communicate with storage devices 125A,B and may include other similar components such as web server and database management programs. The operating system servers 123A,B communicate with the installation module 113 using any type of well known or specialized protocol over the network 119. The operating system servers 123A,B can offer any number of operating systems 117A-D for download. The operating systems 117A-D available for download can be stored in databases 125A,B attached to or in communication with the operating system servers 123A,B. Any number of databases can be accessed by an operating system server 123A,B. Similarly, any number of operating system servers 123A,B can provide operating systems 117A-D for download.

Figure 2:
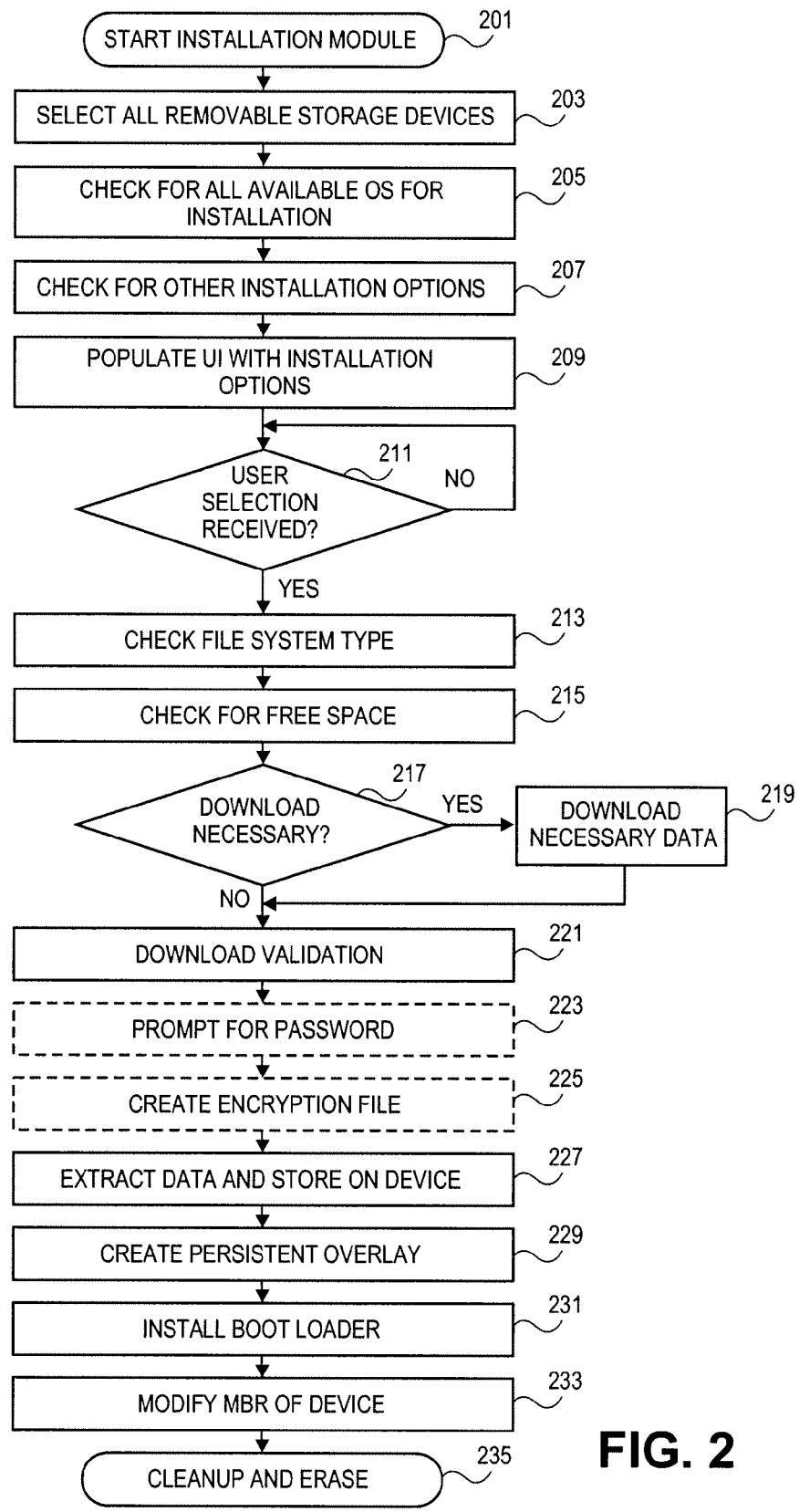
FIG. 2 is a flowchart of one embodiment of a process for live operating system installation.

FIG. 2 is a flowchart of one embodiment of a process for live operating system installation. In one embodiment, the process is initiated in response to a user starting the installation module (block 201). The user can start the installation module through any type of user interface or program selection system including an icon in a graphical user interface or a command at a command line prompt. In a hardware implementation, the installation module could be initiated by a button press or similar interface mechanism.

The installation module checks for the availability of removable portable storage devices (block 203). The installation module queries device drivers, removable device management programs, operating systems or similar programs to detect each removable portable storage device in communication with or directly connected to the computer system. The removable portable storage devices can be connected to the computer system through any type of port, channel or communication mechanism that is externally accessible to the portable device (e.g., USB ports). The detection of the removable portable storage devices can also include the gathering of data about or characteristics of the removable storage devices. This data can be utilized to determine the suitability of the removable storage devices for receiving an installation of an operating system. Device data and characteristics can include storage device size, free storage availability, connection speed, file system type and similar characteristics.

The installation module can then search for the availability of operating systems to be installed on the removable storage device (block 205). The installation program can query known operating system servers, operating system servers specified by the user, perform a search for operating system servers or similarly detect and obtain information about available operating systems. The installation program can also query and search the computer system that is executing the installation module or that is coupled to the installation module for operating systems available on removable or fixed media or storage devices.

These operating system servers and sources can also be queried for the availability of other installation options (block 207). Other installation options can include additional applications that are available for installation, encryption options for installation and similar installation options. All of the data and characteristic information obtained by the installation module from the operating system servers and similar sources is then utilized to populate a user interface that allows the user to select the operating system, source and other options that are desired. The user interface can be a graphical user interface. An example graphical user interface is discussed in greater detail herein below in regard to FIG. 3

The installation module awaits the confirmation of the user selections (block 211). Upon receiving the user selections from amongst the available options the installation program begins a check of the compatibility of the selections with the characteristics of the removable storage device. In another embodiment, the installation module only displays options that are compatible with the removable storage device. The compatibility check can include a determination of the file system type required by the selected operating system and whether the removable device has that file system (block 213). A device with a compatible file system can have the operating system installed without addition of a partition or formatting of the storage device. In one embodiment, the operating system can be installed into any type of file system as a document within that file system or selection of a version of the operating system compatible with the file system. A check can also be made to determine whether there is sufficient free space available for the selected operating system (block 215). If insufficient space or an incompatible file file system is detected then the installation operation can be aborted or an alternative operating system installation or configuration suggested that fits the characteristics or limitations of the removable storage device.

After these prerequisite checks complete successfully, then a check is made to determine whether the selected operating system is available locally or whether it must be downloaded from a remote operating system server (block 217). If the operating system is not available locally, then the process of downloading the operating system is initiated with the operating system server (block 219). Any type of protocol can be utilized to initiate and manage the download of the operating system including a file transfer protocol, a hyper-text transfer protocol, a peer to peer protocol or similar data transfer protocol. The installation process continues once the operating system has been completely downloaded. In another embodiment, the installation process continues before complete download by beginning the installation of completed components of the operating system or similar techniques. The download of the operating system is validated to ensure that the complete uncorrupted file was received (block 221). Any type of validation process can be utilized such a checksum comparison.

In one embodiment, the downloaded file may be encrypted or the installation of the operating system is encrypted. The installation module queries the user for a password (block 223) to decrypt the encrypted operating system or to use for encrypting the operating system (block 225). Any type or combination of encryption algorithms can be utilized to encrypt the operating system download file or installation files. In other embodiments, encryption is not utilized and these steps are not included in the installation process.

The received operating system files may be compressed or similarly encoded with a known compression algorithm. The appropriate decompression algorithm is used to extract data from the downloaded operating system file (block 227). The extracted data is then transferred and stored onto the removable storage device. A persistent overlay is also created (block 229). The size of the persistent overlay, which is an area of memory that is dedicated to the installed operating system is selected by the user. The persistent overlay can be used to store additional files in a format or files system utilized by the operating system.

A boot loader, if not already present is then installed on the removable storage device (block 231). The boot loader is a program that is accessed by a processor or basic input-output system (BIOS) during system start up that then loads the operating system. The boot loader can also provide an interface for the selection of an operating system to load when multiple operating systems are available. The boot loader can provide an interface for selecting between multiple operating systems on the removable storage device or across multiple devices including the computer system and the removable storage device.

The master boot record is also modified (block 233). The master boot record is a data structure on the removable storage device that indicates the address of the boot loader and/or the operating system. The master boot record is in a known location on the removable storage device that is checked by the processor and/or BIOS during system startup. After the master boot record has been updated then the installation process cleans up, by closing files and performing similar operations, and then exits to complete the installation process (block 235).

Figure 3:
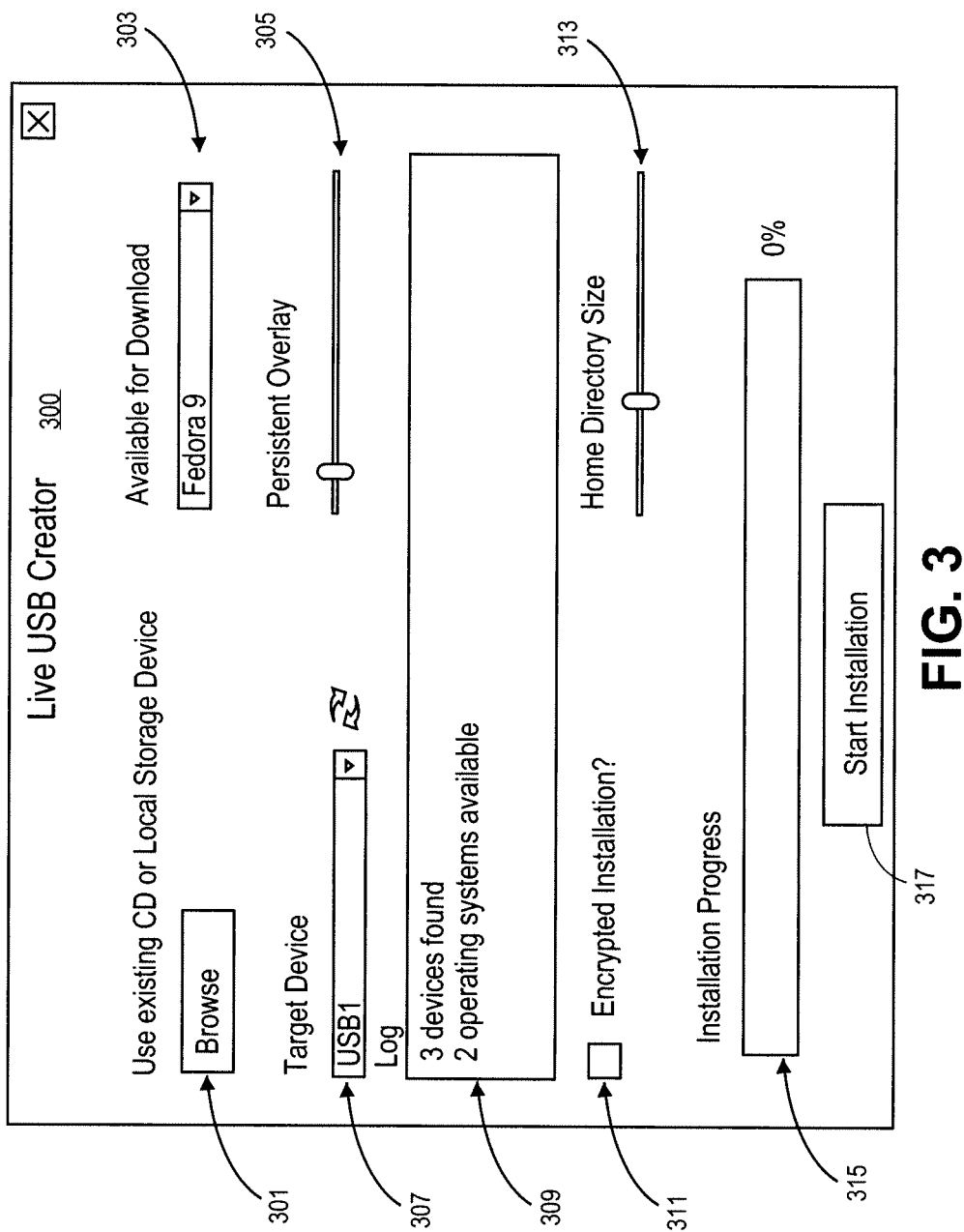
FIG. 3 is a diagram of one embodiment of a live operating system installation interface.

FIG. 3 is a diagram of one embodiment of a live operating system installation interface. The illustrated user interface 300 is a graphical user interface. Other types of user interfaces including a command line interface can also be provided. The user interface 300 displays options for the installation of an operating system on a removable portable storage device. Any number of options can be provided dependent on those found during the initiation of the installation module. Any type of user interface mechanisms can also be incorporated into the user interface. For example, user interface mechanisms can include drop down menus, sliding bars, text fields, radio buttons, icons and similar user interface mechanisms.

The user interface includes a set of user interface mechanisms for selecting an operating system for installation. The set of user interface mechanisms can include a user interface mechanism 301 for selecting or finding a local operating system for installation. These operating systems may be on a removable medium such as a CD or on a fixed medium such as a hard drive. The user interface mechanism can present a list of known operating systems, a field for inputting an address or an option to browse 301 the file system to find the operating system and select it. A separate or combined user interface mechanism 303 allows the user to select from a list of operating systems that may be remote or local to the computer system. Any number of operating systems can be selected by the user. The user interface mechanism can also allow a user to select an order of preference in the operating system installation, such as preferences to install from a local computer or to install a new version of an operating system, which the installation module will evaluate in relation to the characteristics of the removable portable storage device.

A target device 307 user interface mechanism can also be presented. The target device 307 user interface mechanism provides a set of available removable portable storage devices to allow a user to select the set of removable storage devices on which to install the selected operating systems. The target device 307 interface mechanism can allow any number of removable storage devices to be selected.

The user interface 300 can also include a persistent overlay 305 user interface mechanism. The persistent overlay 305 user interface mechanism presents a set of persistent overlay sizing options to the user. The user can set the size of the persistent overlay to be installed with the operating system. The persistent overlay 305 user interface mechanism can set forth the maximum and minimum persistent overlay sizes based on the characteristics of the selected operating systems and removable storage devices.

The user interface mechanism 300 can also include a log 309 or similar text feedback user interface mechanism. The log 309 can be used by the installation module to list the actions that have been take, the status of the installation module, the progress of the installation process and similar feedback. The log 309 can display text or graphical information or any combination thereof to the user.

The user interface 300 can include a user interface mechanism 311 for selection of encryption. The encryption selection mechanism 311 can be a simple on/off toggle or can present a set of a encryption algorithms for enciphering the home directory, persistent overlay or similar component of the operating system installation. The user interface 300 can also present a home directory selection mechanism 313 to allow a user to designate the size of a home directory. The home directory is a storage space designated for user-created and user-downloaded files. This directory is automatically mounted by the operating system. The home directory can also be specifically designated for encryption. The home directory selection mechanism 313 can indicate the minimum and maximum home directory sizes based on the characteristics of the selected operating systems, selected components and removable storage devices.

The user interface 300 can also include a start button 317 and progress bar 315. The start button 317 can be selected by the user to confirm the other user selections made through the user interface 300. The progress bar 315 is then continuously updated as the installation process is carried out to indicate to the user the status of the installation.

Figure 4:
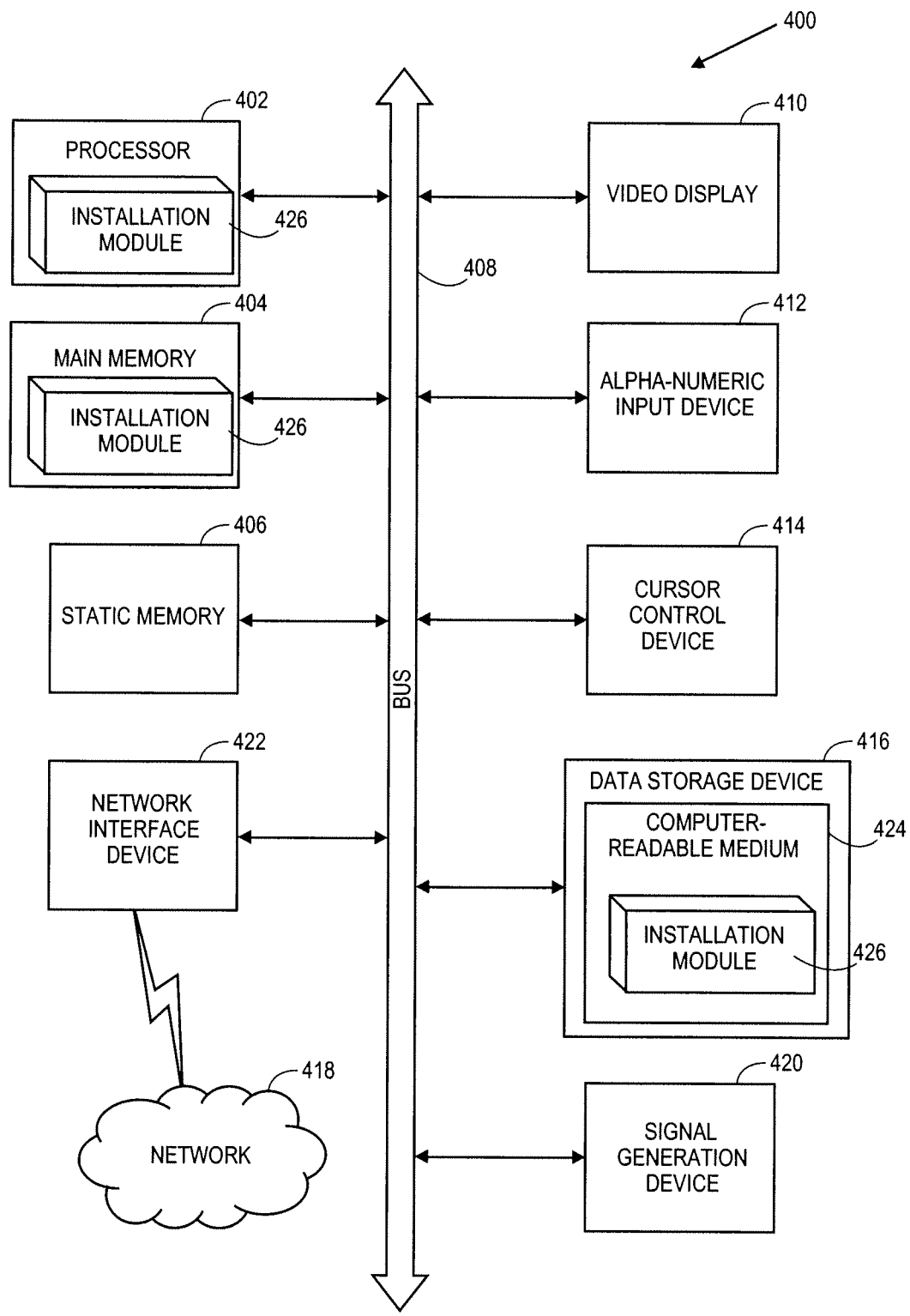
FIG. 4 is a diagram of one embodiment of a computer system for providing live operating system installation.

FIG. 4 is a diagram of one embodiment of a computer system for providing live operating system installation. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the installation module and the server computer executing the operating system server) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the module 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the installation module 426) embodying any one or more of the methodologies or functions described herein. The installation module 426 may also reside, completely or at least partially, within the main memory 404 and/or within the processing device 402 during execution thereof by the computer system 400, the main memory 404 and the processing device 402 also constituting machine-readable storage media. The installation module 426 may further be transmitted or received over a network 418 via the network interface device 422.

The machine-readable storage medium 424 may also be used to store the installation module 426 persistently. While the machine-readable storage medium 424 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "computing," "generating," "determining," "selecting," "displaying," "searching," "receiving," "updating," "modifying," "assigning," "requesting," "combining," "running," "correcting," "moving," "executing," "checking," "incrementing," "initiating," "returning," "retrieving," "encrypting," "truncating," "replacing," "calculating," "recalculating," "outputting," "performing," "multiplying" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for installing live operating systems onto removable portable storage devices has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    detecting, by a processing device of a first computer, a formatted removable persistent storage device in communication with the first computer, wherein the removable persistent storage device comprises a partition, a master boot record, and a boot loader;
    receiving, by the first computer, an installation attribute to install a live operating system;
    determining, by the first computer, whether one or more operating systems are currently installed in the removable persistent storage device;
    creating a persistent overlay on the removable persistent storage device in the partition wherein the persistent overlay is space reserved for the live operating system;
    installing the live operating system within the removable persistent storage device without creating an additional partition within which to install the live operating system, and wherein, in response to the first computer determining that one or more operating systems are currently installed within the removable persistent storage device, the installing, further comprises installing without destroying the one or more operating systems currently installed;
    providing an interface, in response to more than one operating system is currently installed in the removable persistent storage device, for selecting one operating system from amongst the more than one operating systems currently installed, wherein the boot loader is to load the selected live operating system to be loaded;
    modifying the master boot record of the removable persistent storage device to reflect which, amongst the more than one operating systems currently installed in the removable persistent storage device, is the live operating system that the boot loader is to load from the removable persistent storage device;
    and wherein the live operating system is executable by a second computer, without being installed onto the second computer, when the removable persistent storage device is in communication with the second computer and is no longer in communication with the first computer, and wherein the persistent overlay is writeable by the live operating system when the removable persistent storage device is in communication with the second computer.

2. The method of claim 1, wherein installing the live operating system onto the removable persistent storage device is non-destructive to existing data.

3. The method of claim 1, further comprising:
    detecting an operating system that is available to be installed onto the removable persistent storage device.

4. The method of claim 1, wherein the installation attributes comprise at least one of a persistent overlay size, an operating system size, a home directory size, an encryption or a file system format.

5. The method of claim 1, further comprising:
    downloading the live operating system from a remote server;
    and performing a validation operation after the downloading to verify successful downloading of the live operating system.

6. The method of claim 1, further comprising:
    installing a home directory or the persistent overlay in an encrypted format.

7. A non-transitory computer readable storage medium to cause a processing device of a first computer to:
    detect, by a processing device of a first computer, a formatted removable persistent storage device in communication with the first computer, wherein the removable persistent storage device comprises a partition, a master boot record, and a boot loader;
    receive, by the first computer, an installation attribute to install a live operating system;
    determine, by the first computer, whether one or more operating systems are currently installed in the removable persistent storage device;
    create a persistent overlay on the removable persistent storage device in the partition wherein the persistent overlay is space reserved for the live operating system;
    install the live operating system within the removable persistent storage device without creating an additional partition within which to install the live operating system, and wherein in response to the determination by the first computer that one or more operating systems are currently installed within the removable persistent storage device, the install further comprises install without destroying the one or more operating systems currently installed;
    provide an interface, in response to more than one operating system is currently installed in the removable persistent storage device, for selecting one operating system from amongst the more than one operating systems currently installed, wherein the boot loader is to load the selected live operating system to be loaded;
    modify the master boot record of the removable persistent storage device to reflect which, amongst the more than one operating systems currently installed in the removable persistent storage device, is the live operating system that the boot loader is to load from the removable persistent storage device;

and wherein the live operating system is executable by a second computer, without being installed onto the second computer, when the removable persistent storage device is in communication with the second computer and is no longer in communication with the first computer, and wherein the persistent overlay is writeable by the live operating system when the removable persistent storage device is in communication with the second computer.

8. The non-transitory computer readable storage medium of claim 7, wherein to install the live operating system onto the removable persistent storage device is non-destructive to existing data.

9. The non-transitory computer readable storage medium of claim 7, the processing device further to: download the live operating system from a remote server.

10. The non-transitory computer readable storage medium of claim 9, the processing device further to: perform a validation operation after the download to verify successful downloading of the live operating system.

11. The non-transitory computer readable storage medium of claim 7, the processing device further to: detect an operating system that is available to be installed onto the removable persistent storage device.

12. The non-transitory computer readable storage medium of claim 7, wherein the installation attributes comprise at least one of a persistent overlay size, an operating system size, a home directory size, an encryption or a file system format.

13. The non-transitory computer readable storage medium of claim 7, the processing device further to: install a home directory or the persistent overlay in an encrypted format.

14. A system comprising:
a memory;
a processing device, operatively coupled to the memory, to:
detect, by a processing device of a first computer, a formatted removable persistent storage device in communication with the first computer, wherein the removable persistent storage device comprises a partition, a master boot record, and a boot loader;
receive, by the first computer, an installation attribute to install a live operating system;
determine, by the first computer, whether one or more operating systems are currently installed in the removable persistent storage device;
create a persistent overlay on the removable persistent storage device in the partition wherein the persistent overlay is space reserved for the live operating system;
install the live operating system within the removable persistent storage device without creating an additional partition within which to install the live operating system, and wherein in response to the determination that one or more operating systems are currently installed within the removable persistent storage device, the install further comprises to install without destroying the one or more operating systems currently installed;
provide an interface, in response to more than one operating system is currently installed in the removable persistent storage device, for selecting one operating system from amongst all operating systems currently installed, wherein the bootloader is to load the selected live operating system to be loaded;
modify the master boot record of the removable persistent storage device to reflect which, amongst the more than one operating systems currently installed in the removable persistent storage device, is the live operating system that the boot loader is to load from the removable persistent storage device;
and wherein the live operating system is executable by a second computer, without being installed onto the second computer, when the removable persistent storage device is in communication with the second computer and is no longer in communication with the first computer, and wherein the persistent overlay is writeable by the live operating system when the removable persistent storage device is in communication with the second computer.

15. The system of claim 14, wherein the processing device is further to:
detect an operating system that is available to be installed onto the removable persistent storage device.

16. The system of claim 14, wherein the processing device is further to:
download the live operating system from a remote server;
and perform a validation operation after the downloading to verify successful downloading of the live operating system.

17. The system of claim 14, wherein the processing device is further is to:
install the persistent overlay in an encrypted format.

* * * * *